(12) United States Patent
Norris et al.

(10) Patent No.: US 6,244,375 B1
(45) Date of Patent: Jun. 12, 2001

(54) SYSTEMS AND METHODS FOR PERFORMING REAL TIME SEISMIC SURVEYS

(75) Inventors: Michael W. Norris, Cypress, TX (US); Philip Burge, Aberdeen (GB)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/560,252

(22) Filed: Apr. 26, 2000

(51) Int. Cl.$^7$ ....................................................... G01V 1/40
(52) U.S. Cl. ............................ 181/102; 181/112; 367/25; 166/250.01
(58) Field of Search ...................... 181/102, 108, 181/112, 110, 122; 367/25, 31, 37, 28, 29, 73, 911; 166/250.01

(56) References Cited

U.S. PATENT DOCUMENTS

| | | |
|---|---|---|
| 5,259,452 | 11/1993 | Wittrisch . |
| 5,461,594 | 10/1995 | Mougenot et al. . |
| 5,481,502 | 1/1996 | Cretin et al. . |
| 5,550,785 | 8/1996 | Laurent et al. . |
| 5,597,042 | 1/1997 | Tubel et al. . |
| 5,721,538 | 2/1998 | Tubel et al. . |
| 5,798,982 * | 8/1998 | He et al. ................................. 367/73 |
| 6,065,538 * | 5/2000 | Reimers et al. ....................... 181/112 |

* cited by examiner

Primary Examiner—Khanh Dang
(74) Attorney, Agent, or Firm—Madan, Mossman & Sriram, P.C.

(57) ABSTRACT

This invention provides near real-time systems and methods for acquiring seismic data in reservoirs at very high resolution such that advancing fluid fronts can be mapped substantially in real time. In one system, one or more autonomous devices are deployed in the well to detect seismic data. Each device includes at least one seismic receiver. An acoustic energy source, preferably at the surface, induces acoustic waves into the subsurface formations. The autonomous devices move in the well and detect seismic waves at selected discrete locations in the well. The seismic data is stored in on-board memory. After the data acquisition, the devices dock at a receiver stations in the well. The receiver stations download the stored data from the memory and transmit such data to a surface control unit via a two-way data link between the receiver and the surface control unit. The surface computer system also sends command signals to the downhole receiver to control the operation of the individual devices. The receiver stations can be programmed to control the operation of the devices. The devices may include resident programs to perform the survey operations at specified intervals. The data gathered by the devices is used to update existing seismic maps in determining the boundary conditions of the fluid fronts. For subsea wells, autonomous devices may also be deployed at sea bottom to travel along predefined paths to collect seismic data. A subsea control station or receiver provides power and data transmission function for the subsea devices. The seismic data from the well and the sea bottom are then used to update the 3D maps to obtain 4D maps and to model the reservoirs.

15 Claims, 2 Drawing Sheets

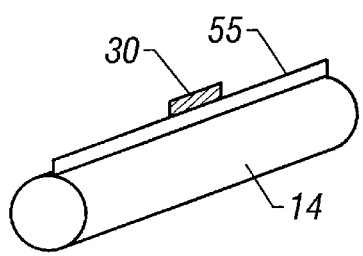
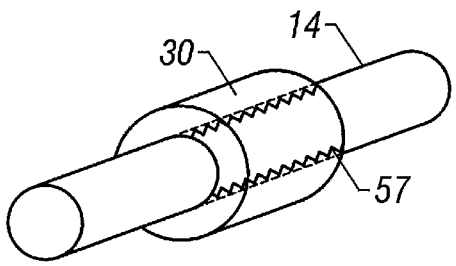
FIG. 3
FIG. 4
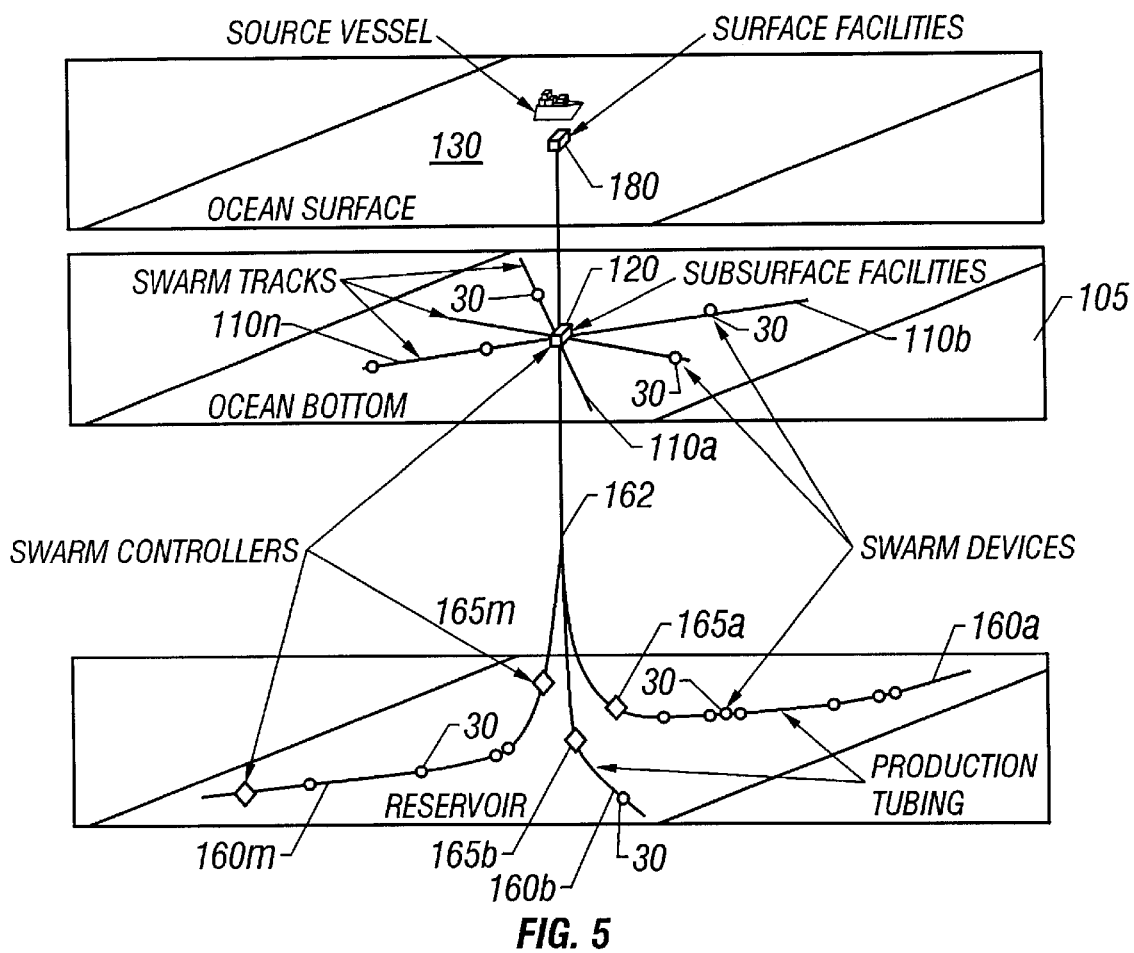
FIG. 5

SYSTEMS AND METHODS FOR PERFORMING REAL TIME SEISMIC SURVEYS

BACKGROUND OF THE INVENTION

1. Field of the Invention

This invention relates generally to production of hydrocarbons from subsurface formations and more particularly to in-hole seismic data acquisition to map advancing fluid fronts within a field or around a single wellbore.

2. Description of the Related Art

In order to relatively precisely map advancing fluid fronts within a field or around a single wellbore requires the use of deep reading measurements at spatial resolutions of less than five (5) meters but with the spatial extents of several hundred meters, depending upon the reservoir location, size and the number of wells in the field. Conventional three dimensional ("3D") seismic acquisition and repeated 3D seismic acquisitions (also referred to as the 4D seismic acquisition) and seismic data acquisition techniques known as vertical seismic profiling ("VSP"), 3D VSP and Reverse VSP or Reverse 3D VSP are often utilized to model the reservoirs and/or to determine the advancing fluid fronts in the producing formations. The conventional 3D and 4D surface seismic acquisitions are performed by deploying detectors at or near the surface and the survey area is usually substantially large. The conventional 3D and 4D surveys provide data with limited spatial resolution and no near real-time ability to utilize results because of the lengthy time span required to acquire and process the data, which can take several months. The subsurface VSP and 3D VSP also suffer from long data processing cycles and have limited spatial extent.

Water breakthrough can occur rapidly, especially after a new horizontal well is drilled. Reservoir engineers can take timely action if the fluid front information is available timely.

Another related problem is the expense of acquiring repeat 3D seismic data over a relatively small geographical area, such as between 10–20 Km$^2$. The current seismic surveying vessels using surface towed cables are designed to acquire vast volumes of data over a large region. Ocean bottom cable surveys, wherein seismic sensor or detector cables are deployed on the sea bottom, provide an alternative surveying method but are more expensive than the towed streamer cable acquisition methods.

Co-pending U.S. Pat. application Ser. No. 08/948,150, now U.S. Pat. No. 6,065,538, assigned to the assignee of this application, provides yet another alternative, wherein seismic sensors are deployed in wells formed for such purposes as close to the producing zones. Such techniques also are relatively expensive as they require drilling of additional wells.

The present invention provides systems and methods for acquiring seismic data by deploying movable clusters of seismic detectors in wells to acquire data as needed. Such a system provides seismic data with relatively high spatial resolution and with small spatial extent. Because of the relatively small number of detectors, the data can be processed substantially in real-time and utilized to provide 4D maps of the advancing fluid fronts. Use of such systems in multiple wells in a common field provides maps of the advancing fluid fronts within that field.

SUMMARY OF THE INVENTION

In one aspect, this invention provides near real-time systems and methods for acquiring seismic data in reservoirs at very high spatial resolution such that advancing fluid fronts can be mapped substantially in real time. The systems allow large spatial extents to be investigated at arbitrarily fine spatial intervals or resolution. In one system, one or more autonomous devices are deployed in the well to detect seismic data. Each device includes at least one seismic receiver and may also include an acoustic energy source. The device may include multiple spaced apart receivers. An acoustic energy source, preferably at the surface, induces acoustic waves into the subsurface formations. The autonomous devices move in the well and detect seismic waves traveling to the receivers at known discrete locations in the well. The devices store the seismic data in on-board memory. After the data acquisition, the devices dock at the receiver stations in the well. The receiver stations provide power to the devices and download the stored data from the memory. A two way data link between a surface control unit, such as a computer system, and the downhole receiver is used to transmit data from the receiver to the surface computer. The surface computer system also sends command signals to the downhole receiver to control the operation of the individual devices. The receiver stations can be programmed to control the operation of the devices, which may include resident programs to perform the survey operations at specified intervals.

The data gathered by the devices is used to update existing seismic maps in determining the boundary conditions of the fluid fronts. The amount of the data is relatively small compared to conventional seismic methods, such as VSP, RSVP or surface seismic methods using land cables or streamer cables, and thus can be processed to update the prior 3D data to locate fluid fronts substantially in real time. The data collection spacing defines the spatial resolution, which is selected by the operator based upon the need.

In an alternative method, the devices are deployed in the wellbore and at sea bottom. The devices travel along predefined paths at the sea bottom and in the wells to collect seismic data. Tracks are used to guide the devices in the wells and at the ocean bottom. Coiled tubing laid at the ocean bottom may be used as tracks. A subsea control station or receiver provides power and data transmission function for the subsea devices. A source on a vessel may be used to induce acoustic energy into the subsurface formations. The data from both the wells and the sea bottom is then used to update the 3D maps to obtain 4D maps and to model the reservoirs.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 3 shows a configuration of a track on the production tubing for the autonomous devices.

FIG. 4 shows an alternative method of moving the autonomous devices outside a tubing.

FIG. 5 is a schematic illustration of a layout for ocean bottom and subsurface deployment of the autonomous devices according to one method of the present invention.

DETAILED DESCRIPTION OF THE PREFERRED EMBODIMENTS

The present invention functions in at least two distinct but related modes. The first mode provides a near, real-time method to acquire seismic data in and/or above a reservoir at very high spatial resolution such that advancing fluid fronts can be detected. The second mode provides an alternative method of acquiring repeat 3D seismic surveys over small areas. Both methods allow investigation of large spatial extents at arbitrarily fine spatial intervals.

One way to accomplish this is to install an array of geophones and/or hydrophones (referred herein as seismic receivers or detectors) such that the density of source/receiver pairs is adequate to provide the desired extent and spatial resolution. However, this method requires the permanent installation of a large number of spaced apart receivers in the wellbore, which can be very expensive. Also, this method is usually constrained because telemetry of data to the surface and the reliability of the sensor become significant issues due to the large number of sensors placed in or near wellbores or on the sea floor. The present invention provides seismic data acquisition methods, which utilize a relatively small number of seismic receivers to investigate large spatial extents at predetermined fine spatial intervals.

Figure 1:
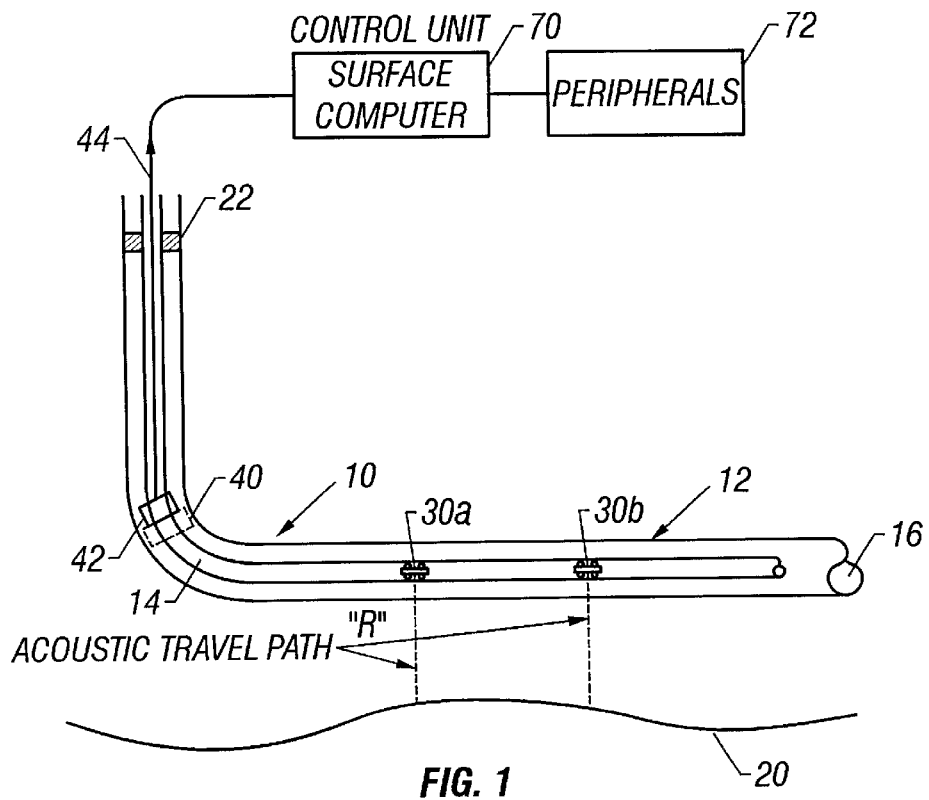
FIG. 1 is a schematic diagram of a production well wherein autonomous devices move inside a production tubing to gather data at discrete locations in the well.
Figure 2:
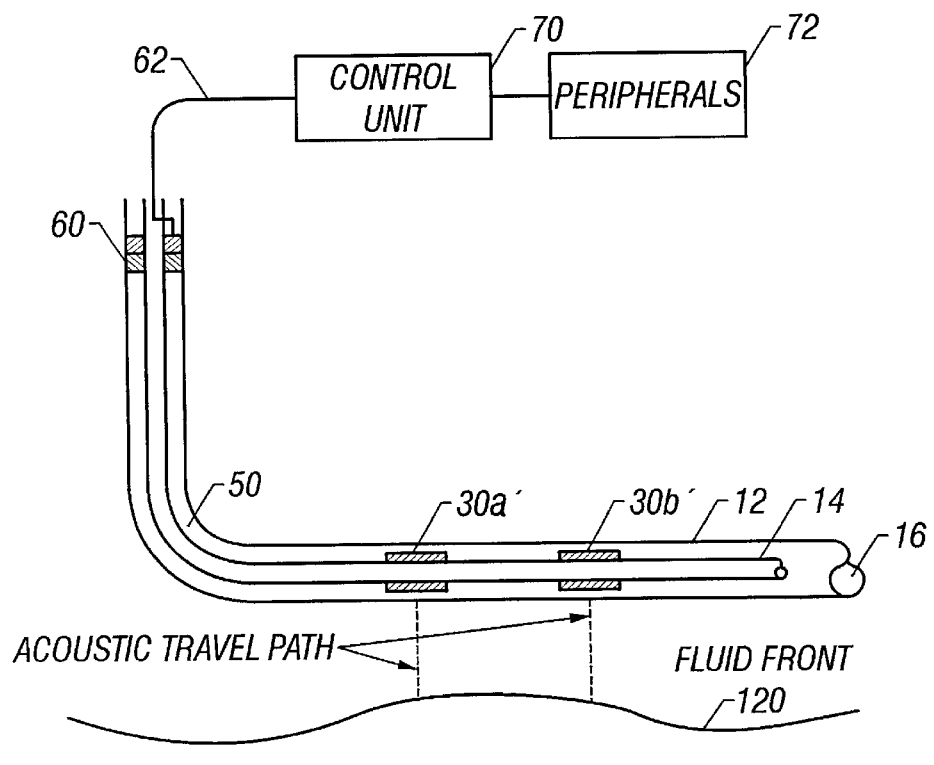
FIG. 2 is a schematic diagram of a production well wherein autonomous devices move in an annulus between the production tubing and the casing to gather data at discrete locations.

The system and methods of the present invention may be utilized for subsurface (i.e. in-hole) or surface applications. FIGS. 1 and 2 illustrate examples of in-hole applications. FIG. 1 is a schematic diagram of a production well 10 that is producing hydrocarbons from a reservoir $R_1$. The well 10 is shown to include a horizontal section 12 formed in the reservoir R. The well 10 is lined with a casing 16. A production tubing 14, disposed in the well 10 and extending to the surface, transports the fluid from the reservoir R to the surface. A packer 22 seals the annulus 24 between the casing 16 and the tubing 14, which ensures the flow through the tubing 14. As the reservoir is depleted, the fluid front 20 starts to approach the well 10. As noted above, it is important to know the location of the fluid front 20 substantially in real-time, so that the well operator can control the production from the reservoir R. To collect seismic data, one or more autonomous devices 30a–30b are launched into the well 10. Each such device includes one or more seismic receivers and may include a source of acoustic energy. The device may include a plurality of spaced-apart receivers. Each receiver may be made up of one or more individual sensor, such as hydrophones. These devices 30a–30b, may be permanently resident or deployed in the well 10. Each such device is adapted to traverse a portion of the well or the entire well 10. The devices 30a–30b can move along the well 10 at a preselected constant speed. The travel speed is selected so that the data integrity is not compromised. The data may also be gathered at discrete, stationary intervals. Each device preferably includes electronic circuitry and associated memory to store the seismic data in the memory. The stored data may be retrieved at the surface upon the return of the devices 30a and 30b to the surface. Alternatively, a data collection station 40 may be provided in the well 10. The devices 30a and 30b programmatically or upon the issuance of a command from the surface move to and dock at the data collection station 40, to transfer the stored data to a data receiver 42. The receiver 42 transmits the retrieved data to the surface via a telemetry line 44. Each autonomous device 30a–30b may include sensors that act as single point sensors or as continuous or discrete, spatially distributed sensors. For example, each device 30a and 30b may carry a plurality of spaced apart seismic sensors, each sensor made up of a set or group of hydrophones, each set acting as a single data point. Multiple hydrophones are commonly used in seismic surveys to combine their detected signals to improve signal to noise ratio of the output.

To obtain seismic survey, acoustic energy is generated at known locations relative to the receivers 30 provided by devices 30a and 30b. For receiver configuration of FIG. 1, the acoustic energy sources can be carried by the devices 30a and 30b, located at known surface locations. The acoustic energy also may be generated by the fluid flow in the production tubing. In the latter case, additional, focused or known signals may be obtained by placing obstructions or signal generators (not shown) in the flow path. The devices 30a and 30b are positioned along the well 10 to ensure that repeat surveys can be acquired at the same locations. This can be done by using the casing/tubing collars as the markers or by other known techniques, such as using induction devices or radio frequency transmitters. In the wellbore configuration of FIG. 1, the devices 30a and 30b move inside the tubing 14, which may be a production tubing, injection tubing or a tubing utilized for monitoring the well 10.

FIG. 2 shows an alternative positioning of the autonomous devices for gathering the seismic data. In this configuration, the devices 30a and 30b reside in the annulus 50 between the casing 12 and the tubing 14. The devices 30a and 30b may move freely in the annulus 50 or on a track associated with the tubing or use the tubing 14 itself as the track.

FIG. 3 shows the tubing 14 with a track 55 on its outside. The device 30 has matching tracks that interlock with the tracks 55 but allow the device 30 to freely move in either direction on the track 55.

FIG. 4 shows a configuration wherein the device 30 uses the tubing 14 as the track. The device 30 may use all or a portion of the outside radial surface as track. The device 30 has travel mechanism 57 that allows it to travel on the outside of the tubing 14 in either direction. When the devices 30a and 30b reside in the annulus 50 then the receiver station 60 can be conveniently located adjacent the packer 22. The devices 30a and 30b travel in the annulus 50 and gather data at discrete spaced-apart locations and then return and dock at the receiver station 60. The receiver station 60 retrieves the data from the devices 30a and 30b and transmits the received data to the surface via a telemetry line 62. The receiver 60 provides power and instructions received from a surface control unit 70 (see FIGS. 1 and 2). The control unit 70 is preferably a computer system, which may be located at the well site or at a remote location, such as an office. The data from the well site may be transmitted to the control unit 70 by satellite or other methods. The control unit 70 can have associated peripherals 72, such as memory units, recorders, display monitors, etc. The control Unit 70 may be programmed to control the operation of the devices 30a and 30b via telemetry links, such as 44 (FIG. 1) and 60 (FIG. 2). An operator may send command signals via the control unit 70 to the receiver station, which in turn controls the devices 30. The operator can select the data collection locations and the data gather interval at such location. Alternatively, each device 30 may be programmed to collect data at spaced intervals in the well 10 and periodically return to the receiver station to unload the data and to recharge the batteries. The devices 30 can be reprogrammed by the receivers 40 or 60. The remote unit 70 can command the receivers to change the programs of the devices 30. Such a system is very flexible, in that the data can be gathered routinely according to the programs stored in the autonomous devices 30, but which can be changed at any time from the surface.

Multiple devices 30 can operate from and/or reside at each receiver station by daisy-chaining the power, telemetry and command busses through the devices. This allows power, data and command signals to pass between the receiver and each of the devices. Each device is given an identification code or address so the receiver station can directly communicate with a particular device to the exclusion of the other devices in the group. This arrangement allows for the use of an arbitrary number of devices. This also allows for the use of redundant devices. When a particular device fails or loses power, it is programmed to go into a neutral mode that allows it to be moved along the tubing or track by the other devices and used as a passive feed through for power, command signals and data transfer.

In addition to acquiring seismic data, the device(s) 30 may include sensors to acquire other information, including pressure, temperature, fluid flow as velocity within the tubing 14, and material build-up within the tubing 14.

A large percentage of wellbores are now being drilled in deep water, often deeper than 2000 feet. Some wells have been drilled or are planned for drilling in water depths exceeding 5000 feet. Seismic surveys using seismic sensor cables deployed at sea bottom are increasingly being used as this method allows placing seismic detectors closer to the subsurface reservoirs. The autonomous devices 30 of the present invention may be deployed at ocean bottom for gathering seismic data. FIG. 5 shows an exemplary layout for using the autonomous devices 30 according to one method of the present invention. A plurality of tracks 110a–110n are laid at the ocean bottom 105 from at least one ocean bottom control station or unit 120. The tracks 110a–110n are shown radially extending from the control station or units 120. The tracks may also be laid as a grid or in any other suitable configuration. A surface vessel 130 carries the acoustic energy source(s). The acoustic energy is generated at known locations as the vessel is moved. The tracks 110a–110n may be coiled tubings laid on the sea bed 105. Continuous coiled tubings are commercially available and are transported on reels. The devices 30 move inside the coiled tubings. Alternatively, exposed tracks may be used. Each device 30 may represent a single point source/receiver or a single point receiver that traverses a defined segment of the sea bed to acquire data. This method allows an operator to focus the device 30 at required spatial distribution to achieve the resolution required for reservoir monitoring. Regardless of the deployment method, a suitable method is used to accurately determine the position of each location where the device 30 acquires data.

The ocean bottom deployment of autonomous device 30 may be augmented with subsurface deployment of these devices. As shown in FIG. 5, the device 30 is deployed in the various lateral wells 160a–160m drilled from a vertical well or main well 162 extending to the ocean bottom 105. The device 30 in each subsurface well communicates to a control unit receiver. For example the device 30 in the well 160a communicates with a central unit 165a while device 30 in wells 160b and 160n respectively is in communication with the control units 162b and 162m. The devices in the subsurface operate in the manner described above with respect to FIGS. 1 and 2.

In the configuration of FIG. 5, the device 30 in subsurface wells 160a–160m acquires data at defined discrete locations and passes the acquired data to their respective or associated control units 165a–165m, which in turn transmit the data to a surface control unit 180 via the ocean bottom facility 120. A common acoustic energy source at the vessel 130 generates required acoustic energy or signals at predetermined surface locations. The device 30 detects reflected acoustic signals and transmits the acquired data to their respective or associated control units, which transmit the acquired data to a surface control unit 130. The surface unit may be located at the vessel 130 or at a remote site.

The data acquired by the above-described system and methods is used to update existing 3D seismic maps and to obtain models of the reservoir $R_2$. The location of the seismic receivers or detectors 30 is relatively close to the subsurface reflection points (such as bed boundaries and fluid fronts) to provide higher spatial resolution. Since the amount of data gathered is relatively small as compared to surface seismic surveys, the data can be processed substantially in real-time, which allows to obtain near real-time reservoirs description, which is not feasible with the currently used surface seismic, VSP or RVSP techniques.

The autonomous device 30 of the present invention may also be used for special purposes, such as for setting distributed flow control devices, such as distributed sliding sleeves in a wellbore.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A system for acquiring seismic data from a wellbore formed in a subsurface formation in response to acoustic signals induced in the formation, comprising:
   (a) at least one carrier in the wellbore, the carrier adapted to move along at least a portion of the wellbore, the carrier carrying at least one seismic sensor for detecting seismic signals in response to acoustic signals induced in the subsurface formation, the carrier further having at least one memory for recording seismic data corresponding to the detected signals; and
   (b) a receiver unit in the wellbore for recovering seismic data from the carrier.

2. The system of claim 1 further comprising:
   (i) a two-way communication link for providing data communication between a surface location and the receiver unit in the wellbore; and
   (ii) a surface control unit for receiving the seismic data recovered by the receiver unit in the wellbore over the two-way communication link.

3. The system of claim 1 wherein the at least one carrier stops at selected spaced apart locations in the wellbore to detect seismic signals.

4. The system of claim 3 wherein the carrier further includes a control circuit that controls the movement of the carrier in the wellbore.

5. The system of claim 3 wherein the receiver unit controls the movement of the carrier in the wellbore.

6. The system of claim 3 wherein the receiver unit controls the movement of the at least one carrier in the wellbore in response to command signals transmitted by the surface control unit to the receiver unit.

7. The system of claim 1 wherein the carrier includes a control circuit having a microprocessor and at least one memory unit carrying a program therein for use by the microprocessor.

8. The system of claim 7 wherein the program is upgraded by the receiver unit.

9. The system of claim 1 wherein the carrier is an autonomous device that can move along a portion of the wellbore on its own power according to programmed instructions stored on the carrier.

10. The system of claim 1 wherein the wellbore is formed from an ocean bottom.

11. The system of claim 10 further comprising at least one carrier deployed at the ocean bottom for collecting seismic signals.

12. The system of claim 11 further comprising a second receiver unit at the ocean bottom for retrieving seismic data from the at least one carrier at the ocean bottom.

13. The system of claim 12 wherein further having a third receiver at the surface for receiving seismic data from the receiver unit in the wellbore and the second receiver unit at the ocean bottom.

14. A method of conducting seismic surveys by deploying seismic sensors in a wellbore formed in a subsurface formation said seismic sensors responsive to acoustic signals induced in the formation, said method comprising:

(a) deploying at least one movable device in the wellbore, said at least one movable device carrying at least one seismic sensor for detecting signals indicative of the induced acoustic signals;

(b) inducing the acoustic signals in the subsurface formation;

(c) moving the at least one movable device within the well bore to selected locations and detecting seismic signals by the at least one sensor responsive to the induced acoustic signals; and (d) retrieving the seismic data from the at least one movable device.

15. A method of conducting seismic surveys in a wellbore formed in a subsurface formation, the method comprising:

(a) inducing acoustic signals in the subsurface formation;

(b) deploying at least one movable device in the wellbore and using at least one seismic sensor thereon to detect signals indicative of the induced acoustic signals; and (c) retrieving seismic data including the detected signals from the at least one movable device.

\* \* \* \* \*